J. F. McGUIRE.
NUT LOCK.
APPLICATION FILED JAN. 18, 1912.
1,084,748.
Patented Jan. 20, 1914.
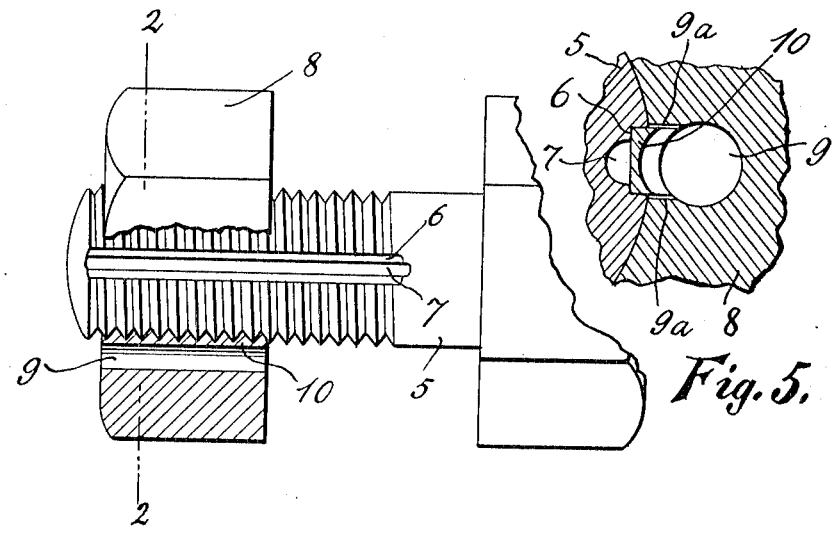
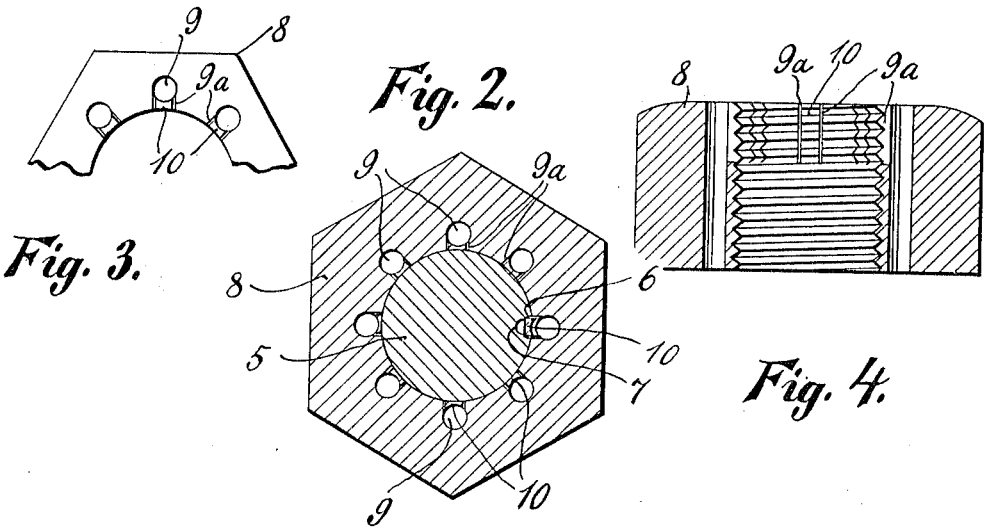
WITNESSES:
INVENTOR
James F. McGuire,
BY
ATTORNEY

UNITED STATES PATENT OFFICE.

JAMES F. McGUIRE, OF CHICAGO, ILLINOIS.

NUT-LOCK.

1,084,748. Specification of Letters Patent. Patented Jan. 20, 1914.

Application filed January 18, 1913. Serial No. 742,855.

*To all whom it may concern:*

Be it known that I, JAMES F. McGUIRE, a citizen of the United States, residing at Chicago, in the county of Cook and State of Illinois, have invented certain new and useful Improvements in Nut-Locks, of which the following is a specification.

This invention has for its object to provide a simple, efficient and inexpensive means for locking a nut upon a bolt.

The lock is produced by forming the bolt with a longitudinal groove into which is bendable a flexible portion of the nut, said portion being also bendable out of the groove to release the nut.

In order that the invention may be fully understood, reference is had to the detailed description appearing hereinafter, together with the accompanying drawing in which the invention is illustrated.

In the drawing, Figure 1 is an elevation of a nut and bolt showing the locking means, the nut being shown partly broken away. Fig. 2 is a cross-section on the line 2—2 of Fig. 1. Fig. 3 is an end view of a fragment of the nut. Fig. 4 is a longitudinal section of the nut. Fig. 5 is an enlarged sectional detail of the locking means.

Referring specifically to the drawing, 5 denotes a bolt having its threaded portion formed with a longitudinal groove 6 having an inner portion 7 of reduced width. The nut 8 which is screwed on this bolt has a series of longitudinal apertures 9 extending entirely therethrough in a circular series close to the bolt hole. From opposite sides of the apertures, slits 9ª are made which extend inward to the bolt hole. The material between the slits forms a flexible tongue 10 which is adapted to be bent into the groove 6. The apertures 9 are located in close proximity to the bolt hole so that the tongues may be thin and flexible. The depth of the slits is such that the nut is not weakened.

To lock the nut, after it is screwed on the bolt, the nut is given a slight turn to bring one of the tongues 10 opposite the groove 6, and then a center punch, drift or other suitable tool is driven into the aperture 9 producing said tongue, to force the latter into the groove, whereupon the nut is securely locked on the bolt. The tongue is not forced into the reduced inner portion 7 of the groove which permits the tool to be driven thereinto for the purpose of forcing the tongue back out of the groove, in order to release the nut. Thus, the nut can be quickly and easily locked or unlocked, and a simple and highly efficient lock is produced. No extra parts are needed and the slight modifications in the bolt and nut, whereby the lock is produced, can be easily and cheaply made.

I claim:

1. The combination of a bolt provided with a longitudinal groove having a reduced inner portion, and a nut having in its bolt hole a flexible portion which is bendable into the outer portion of said groove, said flexible portion being shaped to fit the outer portion of the groove leaving the reduced inner portion vacant.

2. The combination of a bolt having a longitudinal groove, and a nut having a longitudinal aperture close to the bolt hole, at opposite sides of which the nut has slits which extend to the bolt hole, said aperture and slits producing a flexible tongue which is bendable into the groove of the bolt.

In testimony whereof I affix my signature in presence of two witnesses.

JAMES F. McGUIRE.

Witnesses:
 CATHERINE McDERMOTT,
 H. G. BATCHELOR.

Copies of this patent may be obtained for five cents each, by addressing the "Commissioner of Patents, Washington, D. C."